(12) United States Patent
Park

(10) Patent No.: US 6,935,682 B2
(45) Date of Patent: Aug. 30, 2005

(54) SINKING SEAT FOR A VEHICLE

(75) Inventor: Sang-Do Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/749,210

(22) Filed: Dec. 30, 2003

(65) Prior Publication Data

US 2005/0082883 A1 Apr. 21, 2005

(30) Foreign Application Priority Data

Oct. 21, 2003 (KR) .............................. 10-2003-0073381

(51) Int. Cl.⁷ ........................... A47C 9/06; B60N 2/02; A47B 97/00
(52) U.S. Cl. .................... 297/15; 296/65.03; 248/503.1
(58) Field of Search ......................... 297/15; 296/65.03, 296/65.05, 65.09, 66; 248/503.1

(56) References Cited

U.S. PATENT DOCUMENTS

| | | | | |
|---|---|---|---|---|
| 4,227,736 A | * | 10/1980 | Lebault et al. | 296/65.09 |
| 5,195,795 A | * | 3/1993 | Cannera et al. | 296/65.09 |
| 5,644,937 A | * | 7/1997 | Farino | 70/261 |
| 5,839,773 A | * | 11/1998 | Ban et al. | 296/65.09 |
| 6,123,380 A | | 9/2000 | Sturt et al. | |
| 6,182,771 B1 | * | 2/2001 | Nakamura et al. | 172/431 |
| 6,279,982 B1 | * | 8/2001 | Nishimura et al. | 296/65.09 |
| 6,375,245 B1 | * | 4/2002 | Seibold et al. | 296/65.03 |
| 6,375,255 B1 | * | 4/2002 | Maruta et al. | 297/15 |
| 6,644,730 B2 | * | 11/2003 | Sugiura et al. | 297/15 |
| 6,655,738 B2 | * | 12/2003 | Kammerer | 297/331 |
| 2004/0169404 A1 | * | 9/2004 | Imajo et al. | 297/15 |

FOREIGN PATENT DOCUMENTS

JP          11321410          11/1999

* cited by examiner

Primary Examiner—Peter M. Cuomo
Assistant Examiner—Sarah C. Burnham
(74) Attorney, Agent, or Firm—Morgan Lewis & Bockius LLP

(57) ABSTRACT

The present invention is a sinking seat for a vehicle assembled with a rear leg and a grooved leg integrally coupled to enable convenient handling due to the unification of parts. The mounting of the sinking seat onto a vehicle body is simplified by a folded lower part being unfolded to allow a lower part rotating axle to be rotatably coupled to the vehicle body. The assembly process is made simpler, and noise generated from the coupling portion between the vehicle body and the sinking seat is minimized.

2 Claims, 5 Drawing Sheets

SINKING SEAT FOR A VEHICLE

CROSS-REFERENCE TO RELATED APPLICATIONS

This application claims priority to Korean Application No. 10-2003-0073381, filed on Oct. 21, 2003, the disclosure of which is incorporated fully herein by reference.

FIELD OF THE INVENTION

The present invention relates to a sinking seat for a vehicle generally used as a passenger seat that is foldable for insertion into a concave portion of a vehicle floor in case of need and, more particularly, to a technology for mounting the sinking seat onto a vehicle body.

BACKGROUND OF THE INVENTION

As automobiles evolved through the years, the interior of automobiles became increasingly improved to provide luxury, convenience, and comfort. One aspect of improvement to the interior of automobiles has been the construction of automobile seats.

While automobiles have served a specialized purposes in the past (e.g., pickup trucks were used mainly as work trucks, vans were used mainly to transport bulky objects, and sedans were mainly used to transport passengers), automobiles today serve multiple purposes. Minivans, sedans, SUVs, and various other types of automobiles are expected to transport passengers and large, bulky objects, as well as function as work vehicles.

Many times, the seats become a hindrance to the multiple functions a single vehicle must perform. Seats, of course, are a requirement in transporting passengers, but become obstacles when transporting large objects. Some seats fold down, but the result is still a non-uniform surface that may not be stable. A further problem is that the seats, when folded, take up much room in the passenger area, which can substantially limit the size of large objects the automobile can carry and transport.

SUMMARY OF THE INVENTION

The present invention provides a sinking seat for a vehicle adapted to be easily and simply mounted onto a vehicle body and to prevent generation of noise. The sinking seat is designed to be folded for insertion into a concave portion of the vehicle floor. The sinking seat is equipped at front and rear parts of the cushion of the sinking seat with a pair of front mounting parts and a pair of rear mounting parts when the sinking seat is used as a passenger seat, and rear legs integrally connected to the rear mounting parts are also disposed on the sinking seat to provide free rotation in relation to the vehicle body while a coupling state with the vehicle body is maintained when folded and unfolded. The rear leg is semi-permanently fixed to the vehicle body via a bolt or the like. The front and rear mounting parts are designed to be switchable to both a coupled state to a striker provided in the vehicle body and to a detached state.

In a specific embodiment of the present invention, the sinking seat for a vehicle comprises a front mounting part, a rear mounting part, and a rear leg. The front mounting part supports a lower side of a cushion of the seat, and is composed of catch legs with a catch encompassing and being coupled to a striker. A rear mounting part includes grooved legs each having a coupling groove into which the striker is inserted. A rear leg comprises an upper part integrally coupled to the grooved legs and a lower part rotatably coupled to the upper part.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENT

The preferred embodiment of the present invention will now be described in detail with reference to the annexed drawings, where the present embodiment is not limited to the scope of the present invention but is given only for illustrative purposes.

Figure 1:
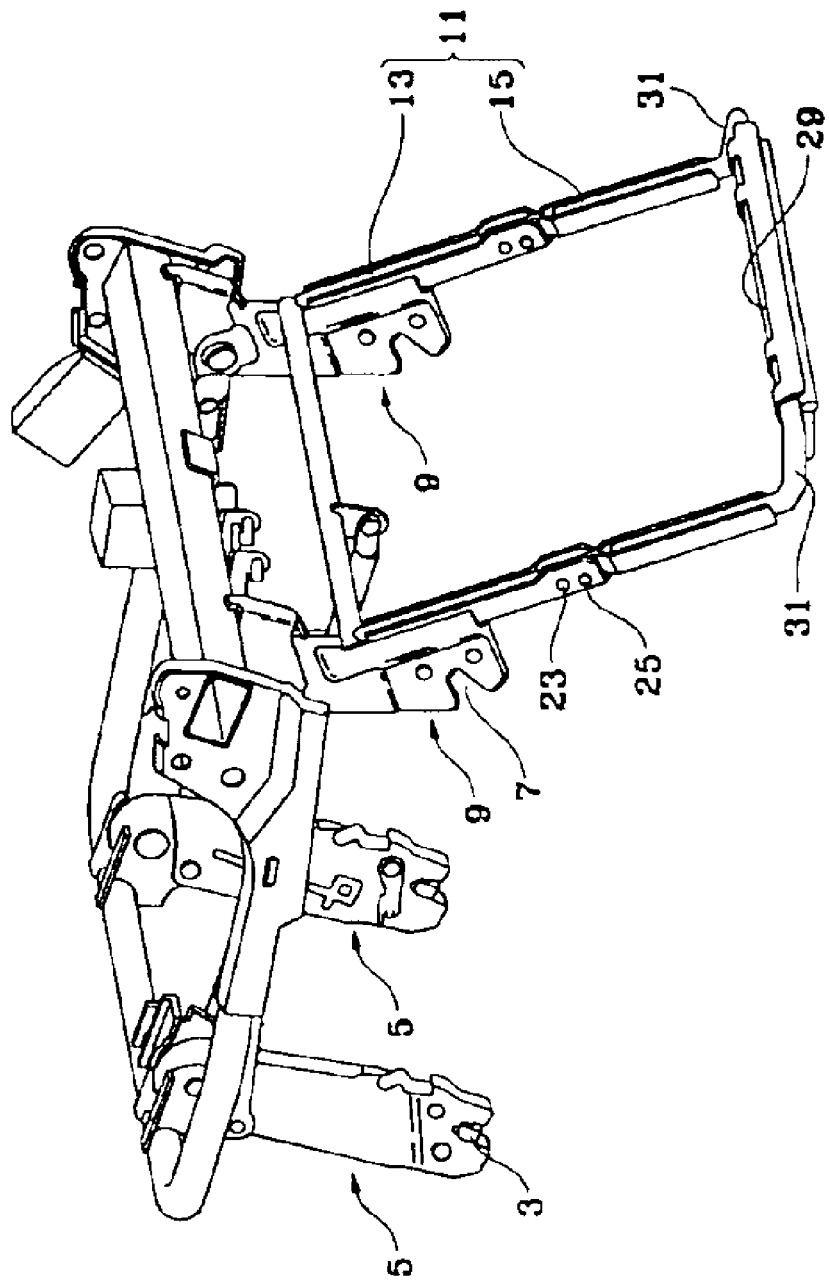
FIG. 1 is a perspective view for illustrating an essential part of a sinking seat for a vehicle according to an embodiment of the present invention.
Figure 5:
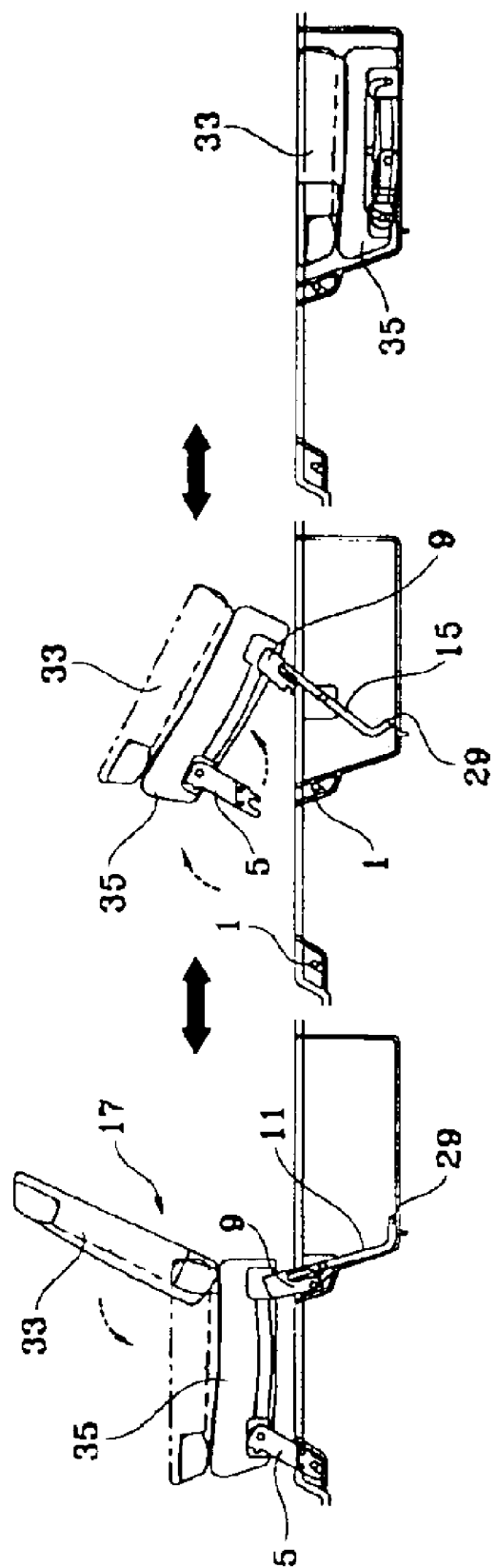
FIG. 5 is a schematic view for illustrating a sinking process of a sinking seat according to an embodiment of the present invention.

As shown in FIG. 1, a front mounting part for supporting the lower side of a cushion of a sinking seat includes a catch leg 5 equipped with a catch 3 for being coupled to a striker 1 (see FIG. 5). A rear mounting part includes a grooved leg 9 having a coupling groove 7 into which a striker 1 is inserted. A rear leg 11 includes an upper part 13 integrally coupled to the grooved leg 9 and a lower part 15 rotatably coupled to the upper part 13.

Figure 2:
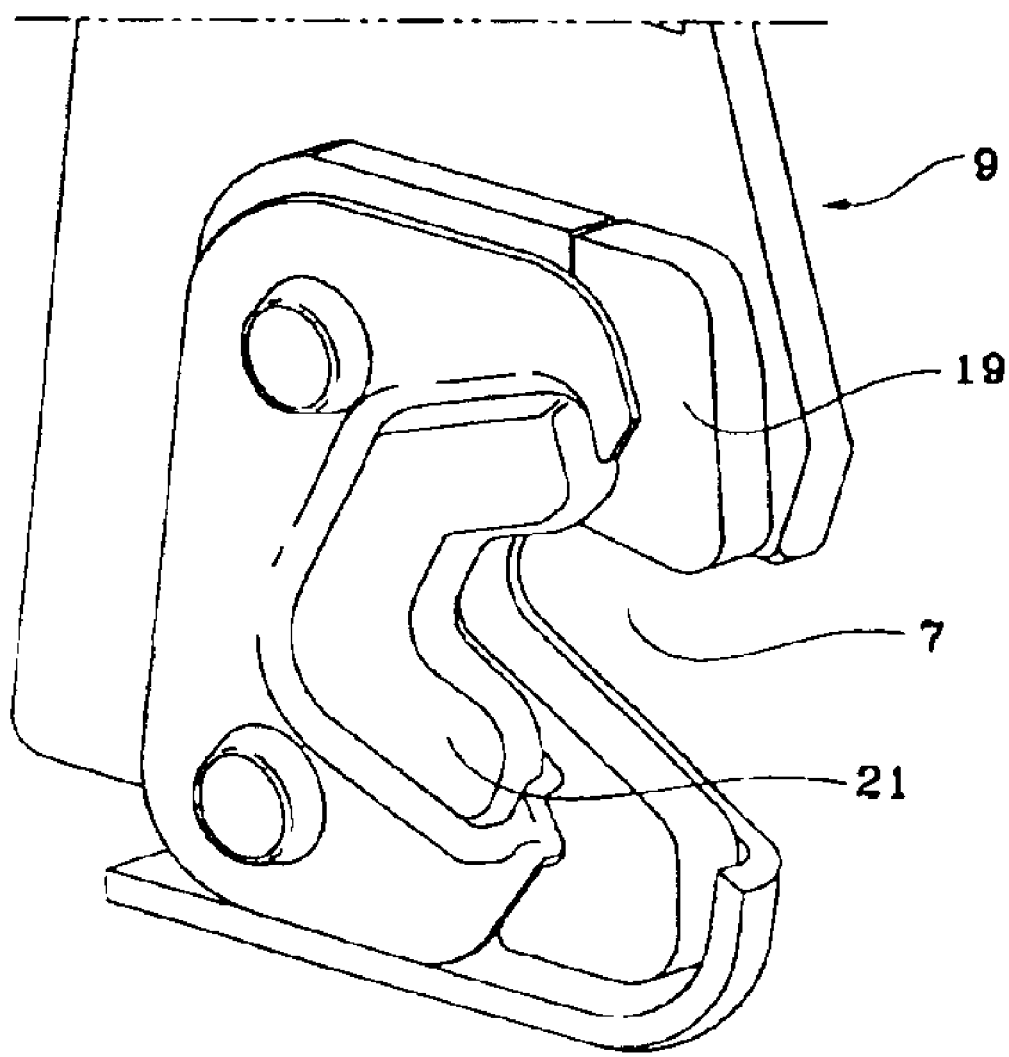
FIG. 2 is a detailed structural view of a rear mounting part according to an embodiment of the present invention.

As depicted in detail in FIG. 2, the coupling groove 7 is open toward the front of a sinking seat 17 (see FIG. 3) and perpendicular to the rear leg 11 such that the grooved leg 9 can be coupled to and detached from the striker 1 by the sinking seat 17 being rotated around a lower end of the lower part 15 of the rear leg 11. The part coupled to the striker 1 is formed by an elastomer component 19 and a rubber component 21. Because the coupling groove 7 is formed by the elastomer component 19 and the rubber component 21 as mentioned above, shock and noise can be alleviated when the grooved leg 9 is coupled to and detached from the striker 1. When the sinking seat 17 is unfolded to become a regular passenger seat to allow the grooved leg 9 to be coupled to the striker 1, the load applied upon the striker 1 by the grooved leg 9 is cushioned to absorb friction, thereby preventing an occurrence of noise.

Figure 3:
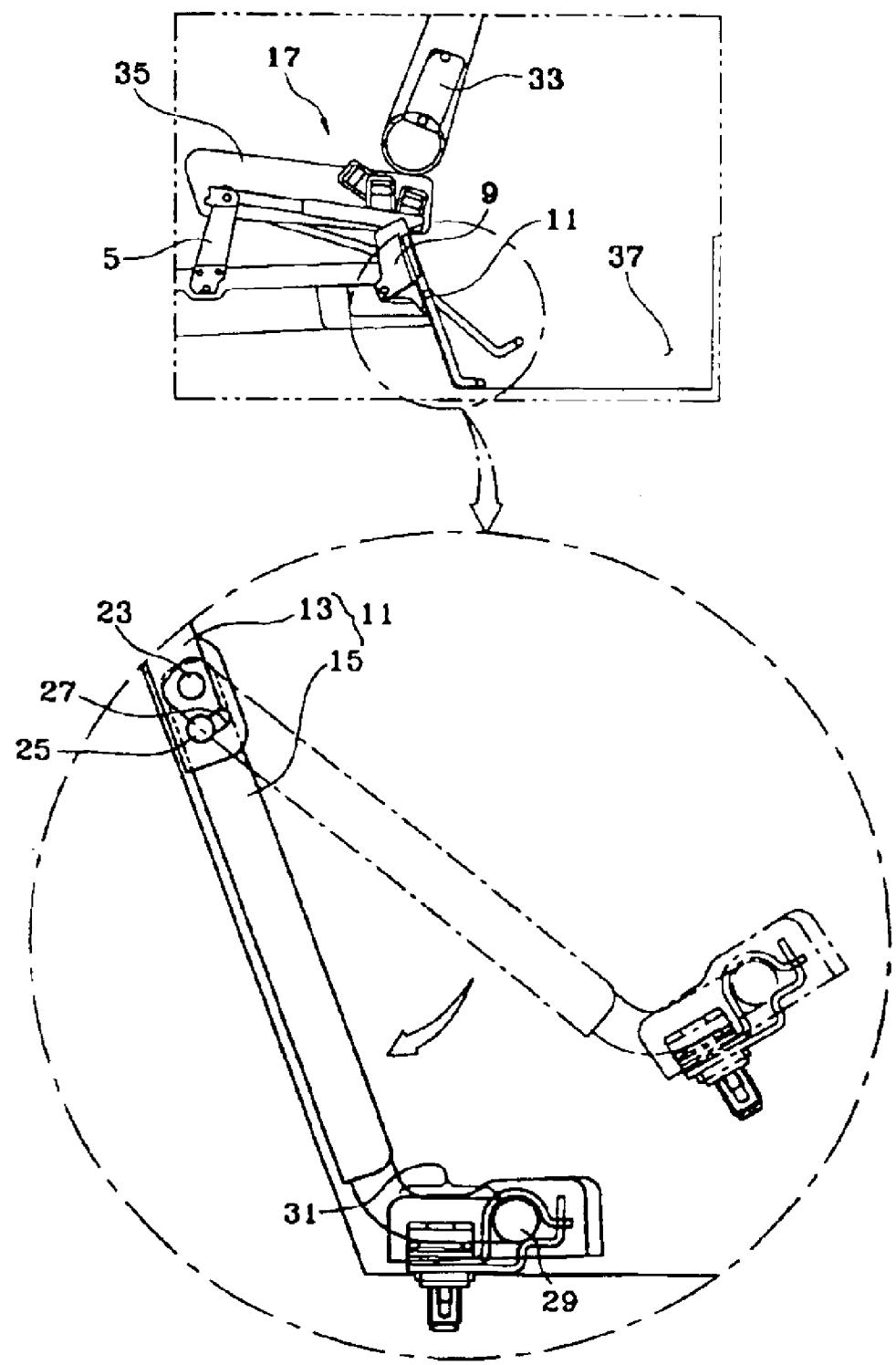
FIG. 3 is a schematic view for of a structure and mounting process of a rear leg according to an embodiment of the present invention.
Figure 4:
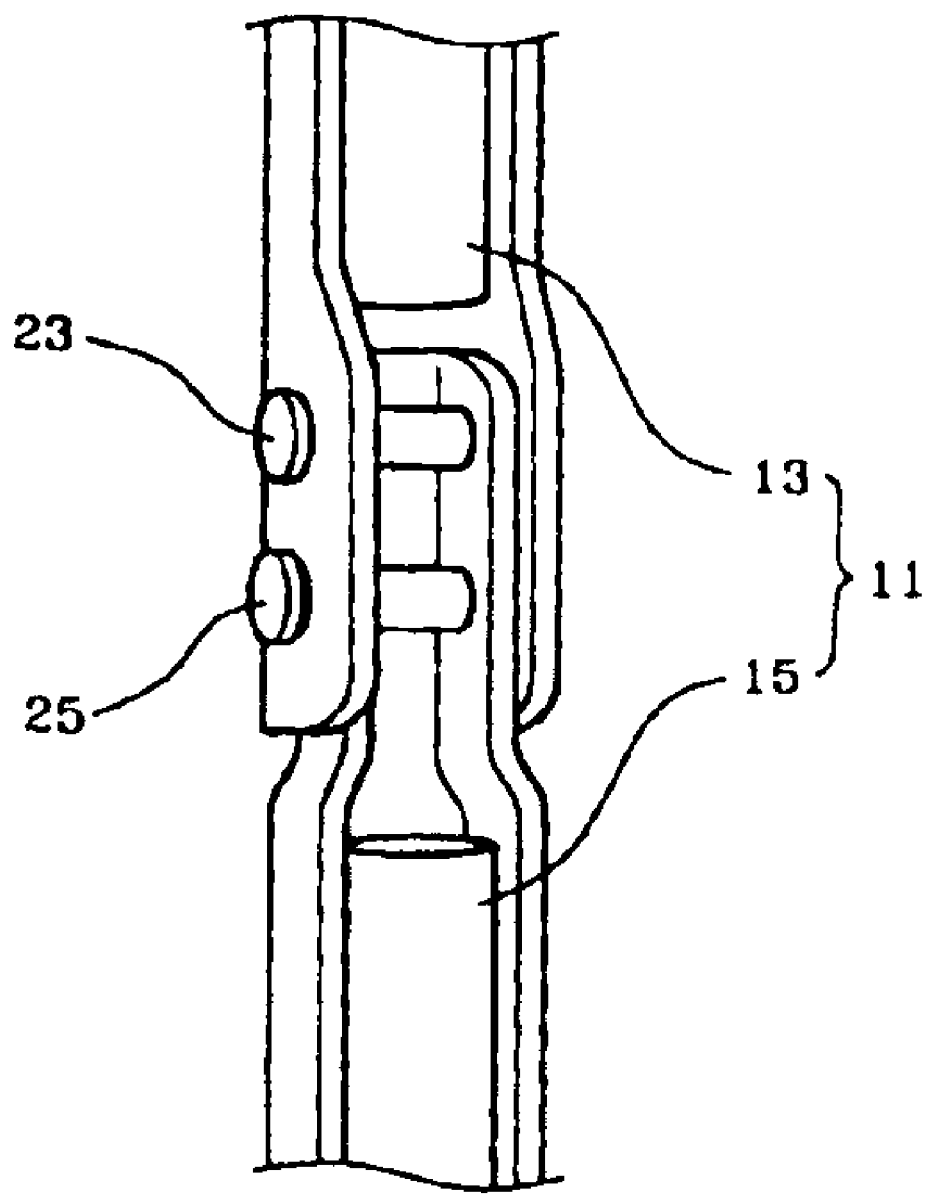
FIG. 4 is a schematic view for illustrating a structure where the upper part and a lower part of the rear leg are connected.

As shown in FIGS. 3 and 4, the coupling part between the upper part 13 and the lower part 15 of the rear leg 11 is respectively composed of a channel having a "U" shaped cross-section such that the lower part 15 can be inserted into an inner side of the upper part 13. The coupling part is disposed with a rotating pin 23 which functions as a rotating axle of the lower part 15 in relation to the upper part 13 by penetrating an upper side of an overlapped part between the upper part 13 and the lower part 15. The rotating pin 23 is mounted thereunder with a guide pin 25 for passing through the upper part 13 and the lower part 15. A guide groove 27 is formed at the upper part 13 so as to be rotated in relation to the rotating pin 23. The guide pin 25 is inserted into the lower part 15 in a non-rotatable fashion. The guide groove 27 is formed at the upper part 13, such that the rotation of the lower part 15 is restricted to a certain extent in relation to the upper part 13 by rotation of the guide pin 25.

Meanwhile, the lower end of the lower part 15 has a bent "U" shape towards the rear side of the sinking seat 17 such that the "U" shaped middle portion (hereinafter referred to as lower part rotating axle 29) functions as a rotating axle for the entire sinking seat 17. When the lower part rotating axle 29 is fixed to the vehicle body, both lateral parts of the "U" shaped portion (hereinafter referred to as moment generating part 31) generate a moment for rotating an upper side of the lower part 15 about the lower part rotating axle 29 toward the rear side of the sinking seat 17.

Next, the process of mounting the sinking seat 17 thus described to a vehicle will be explained with reference to FIG. 3. The sinking seat 17 is mounted onto a vehicle with the rear leg 11 being integrally installed with the grooved leg 9, and the upper part 13 of the rear leg 11 is welded onto the grooved leg 9, while the lower part 15 is rotated upwards about the rotating pin 23 to be mounted in a slightly bent manner relative to the upper part 13. In other words, when the coupling groove 7 of the grooved leg 9 is inserted into the striker 1 and the latch 3 of the catch leg 5 is affixed to the striker 1 in the front area, a first mounting of the sinking seat 17 is carried out, and the lower part 15 is rotated as indicated by the dashed lines of FIG. 3. The lower part 15 is rotated downwards to rotatably secure the lower part rotating axle 29 to the vehicle body via a bolt. When the lower part rotating axle 29 is fixed to the vehicle body, the moment generating part 31 applies a moment to the lower part 15 to support the upper part 13 and the lower part 15 so that the upper and lower parts 13 and 15 can be stably and straightly maintained in an unfolded state. Mounting of the sinking seat 17 is completed by assembling the lower part rotating axle to the vehicle body in a rotatable state. A passenger can now sit on the sinking seat 17.

In FIG. 5, the sinking the sinking seat 17 is described in which a back 33 of the sinking seat is folded forward to allow same to be laid on the upper side of a cushion 35 and the latch 3 of the catch leg 5 is released. Then the cushion 35 and the back 33 are rotated backwards about the lower part rotating axle 29 to allow the catch leg 5 and the grooved leg 9 to be disengaged from their respective strikers 1, and folded towards the cushion 35 so that the sinking seat 17 can be inserted into the concave part 37 in the floor of the automobile. The folded sinking seat 17 can be unfolded in a reverse folding manner to allow the grooved leg 9 to be inserted into the striker 1. When the catch leg 5 is allowed to catch onto the striker 1 and the back 33 of the sinking seat 17 is unfolded, a passenger can sit on the seat.

The foregoing description of the preferred embodiment of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto, and their equivalents.

As apparent from the foregoing, there is an advantage in a sinking seat for a vehicle thus described according to the embodiment of the present invention in that a sinking seat is assembled with a rear leg and a grooved leg being integrally coupled to enable convenient handling due to the unification of parts, and the mounting work of the sinking seat onto the vehicle body is simplified due to the folded lower part being unfolded to allow a lower part rotating axle to rotatably be coupled to the vehicle body. The assembly process is made simpler and noise generated at the coupling portion between the vehicle body and the sinking seat can be minimized.

What is claimed is:

1. A sinking seat for a vehicle, comprising:
    a front mounting part composed of catch legs, each catch leg having a catch encompassing and being coupled to a striker for supporting a lower side of a cushion of the seat;
    a rear mounting part having grooved legs, each grooved leg having a coupling groove into which a striker is inserted; and
    a rear leg including an upper part integrally coupled to said grooved leg and a lower part rotatably coupled to the upper part, wherein a coupling part between the upper part and the lower part of said rear leg comprises a channel having a "U" shaped cross-section such that the lower part is inserted into an inner side of the upper part, a rotating pin, which functions as a rotating axle of the lower part in relation to the upper part, penetrating an upper side of an overlapped part between the upper part and the lower part, a guide pin passing through the upper part and the lower part disposed below the rotating pin, and a guide groove formed in the upper part receiving the guide pin for rotation relative to said rotating pin.

2. The seat in claim 1, wherein the coupling groove is opened toward a front of said sinking seat and perpendicular to said rear leg, and is formed by an elastomer component and a rubber component.

* * * * *

UNITED STATES PATENT AND TRADEMARK OFFICE
CERTIFICATE OF CORRECTION

| | |
|---|---|
| PATENT NO. | : 6,935,682 B2 |
| APPLICATION NO. | : 10/749210 |
| DATED | : August 30, 2005 |
| INVENTOR(S) | : Sang-do Park |

It is certified that error appears in the above-identified patent and that said Letters Patent is hereby corrected as shown below:

On the Title page:

Left column, line (73) "Hyundai Motor Company" should be changed to --Kia Motors Corporation--.

Signed and Sealed this

Seventh Day of April, 2009

JOHN DOLL
*Acting Director of the United States Patent and Trademark Office*